March 17, 1925.
F. H. FLOYD
INDICATOR
Filed July 25, 1922
1,530,160
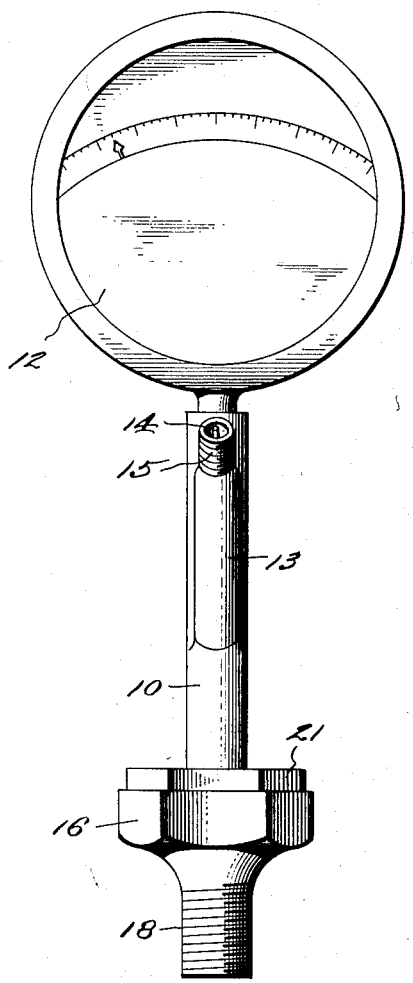
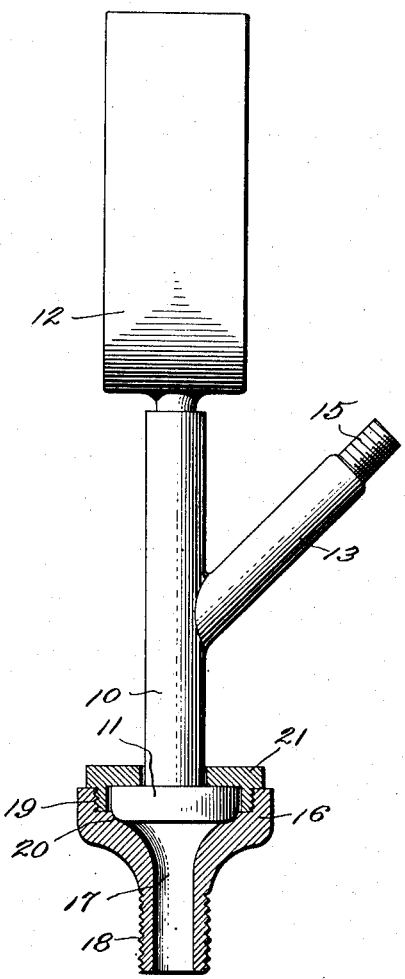
F. H. Floyd,
INVENTOR Patented Mar. 17, 1925.

1,530,160

UNITED STATES PATENT OFFICE.

FRANK H. FLOYD, OF FORT SMITH, ARKANSAS.

INDICATOR.

Application filed July 25, 1922. Serial No. 577,385.

*To all whom it may concern:*

Be it known that I, FRANK H. FLOYD, a citizen of the United States, residing at Fort Smith, in the county of Sebastian and State of Arkansas, have invented new and useful Improvements in Indicators, of which the following is a specification.

This invention relates to testing devices and has for its object the provision of a novel device designed for use on engines for determining the existence and exact location of any compression leaks in the cylinders thereof.

An important object is the provision of a testing device of this character designed primarily to be engaged within the spark plug hole of an internal combustion engine and carrying an air gauge, it being intended that compressed air be forced through the device into the cylinder, whereby any leakage of compression from any cause will produce an audible hissing at some part of the engine so that the mechanic or other person using the device may ascertain the location and character of the leak and be guided in the matter of what repairs are necessary to be made.

An additional object is the provision of a device of this character which will be simple and inexpensive in manufacture, efficient and durable in use and a general improvement in the art.

With the above and other objects and advantages in view the invention consists in the details of construction to be hereinafter more fully described and claimed and illustrated in the accompanying drawings, in which:

Figure 1 is a front elevation of the device and

Figure 2 is a side elevation taken at right angles to Figure 1 with the coupling member shown in section.

Referring more particularly to the drawings I have shown my device as comprising a tubular body 10 terminating at one end in a head 11 which is somewhat enlarged and having its other end carrying a conventional type of air gauge 12. Leading into one side of this body 10 is a branch 13 provided internally with a valve 14 such as the Shroeder valve used in connection with pneumatic tires, the purpose of this valve being to permit compressed air to be forced through the branch 13 and to prevent it from returning. The end of the branch is threaded as shown at 15 in the same manner as the valve stem of a tire.

The device further includes a nipple 16 having a bore 17 and reduced at one end as shown at 18 with this reduced end externally threaded for engagement within the spark plug receiving hole of an engine. The other end of the nipple is relatively large and is formed with a cylindrical threaded recess 19 adjacent which is an annular depression 20 of a size and shape to receive the outermost lower edge of the head 11. The numeral 21 designates a coupling which is formed as a flanged ring externally threaded for screwing engagement within the recess 19, the flange engaging the head 11. This particular coupling is of a somewhat swivel nature so as to permit the device to be screwed into an engine without turning the gauge itself, an action which might be impossible in some instances.

The use of the device is as follows: Whenever a cylinder is to be tested the crank of the engine is turned to bring the piston of this particular cylinder at top dead center of the compression stroke. The device is then screwed into the spark plug hole and is ready for work. By admitting compressed air through the branch 13 pressure will be obtained in the cylinder. The degree of pressure will be indicated by the gauge 12 and it is preferable that the pressure be the same as that attained in the engine cylinder when in actual working condition. The action of the device is very simple for the reason that wherever compression within the cylinder would leak during the running of the engine, there will also be a compressed air leak which will give the operator the opportunity to listen and hear where and how rapidly the compressed air escapes. If the piston rings are in bad condition air will be heard escaping into the crank case and coming out of the breather pipe. If the valves are not setting properly air will be heard escaping through the carburetor or through the exhaust manifold or both. In the event that the cylinder head gasket is in bad condition, provided one is used, air will escape into the radiator resulting in bubbling the water or else the air will blow entirely through to the outside of the motor, depending upon which of the gasket partitions is leaking. In conducting this test with the motor in the original position at top dead center of the piston, should no leaks be found, although it is known that compression must be escaping somewhere as evidenced by the lack of power developed by the motor, it is necessary to go one step further. It is well known that practically all cylinder wall wear comes approximately one-fourth the way down from the top of the cylinder and extends to within one-fourth way of the bottom. The second step of the test involves moving the piston one-half way down on its power stroke and then applying the compressed air as before. Should air then be heard escaping in the crank case it will be known that the trouble is caused by a scored cylinder or a cylinder which is worn out of round. By the process of elimination above described it is thus possible to determine exactly where and how leakage of compression occurs so that the mechanic may start to work at repairing the motor knowing just what is the fault instead of guessing as is necessary in the ordinary practice.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

A device for testing an engine to ascertain compression and valve leaks therein, comprising a body member externally threaded for engagement within the spark plug receiving hole of an engine, said member having a bore enlarged into a chamber, a branched tube having a head swiveled within said chamber, a pressure gage carried by and communicating with the outer end of said tube, said tube having its branch containing a check valve and said branch being formed for connection with a source of compressed air whereby a decrease in the pressure indicated on the gage will indicate leakage within the engine, the swivelling of the head within said chamber permitting rotatable adjustability of the tube whereby the gage thereon and the branch may be disposed out of obstructing relation to surrounding parts of the engine.

In testimony whereof I affix my signature.

FRANK H. FLOYD.